I. D. HUDGINS.
FLUID MOTOR.
APPLICATION FILED DEC. 20, 1916.
1,295,170.
Patented Feb. 25, 1919.
2 SHEETS—SHEET 2.
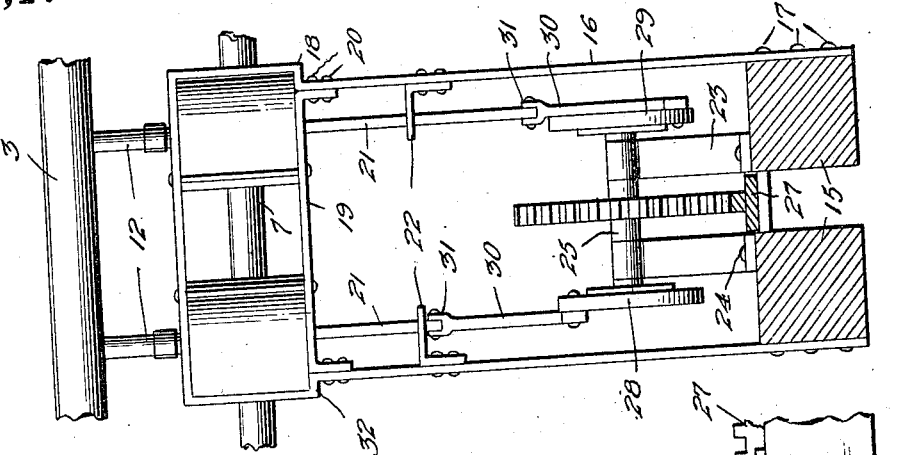
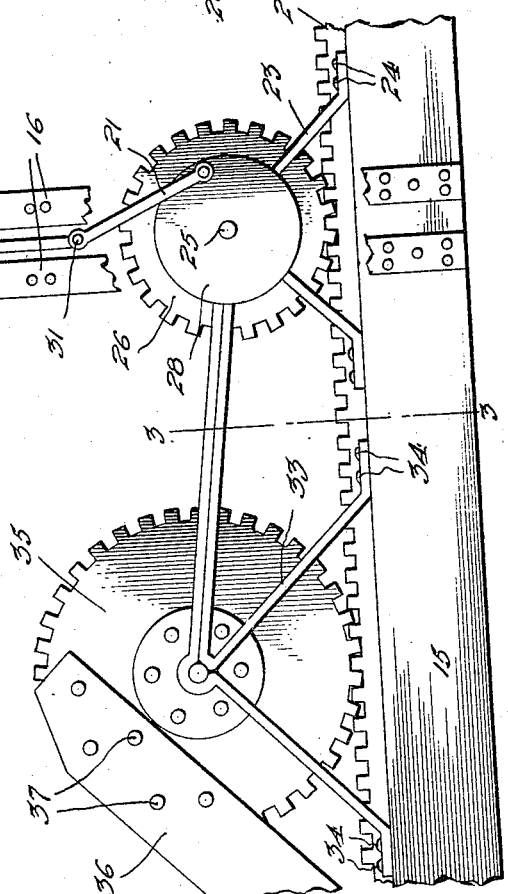
Iverson D. Hudgins.
Inventor
By Geo. P. Kimmel
Attorney

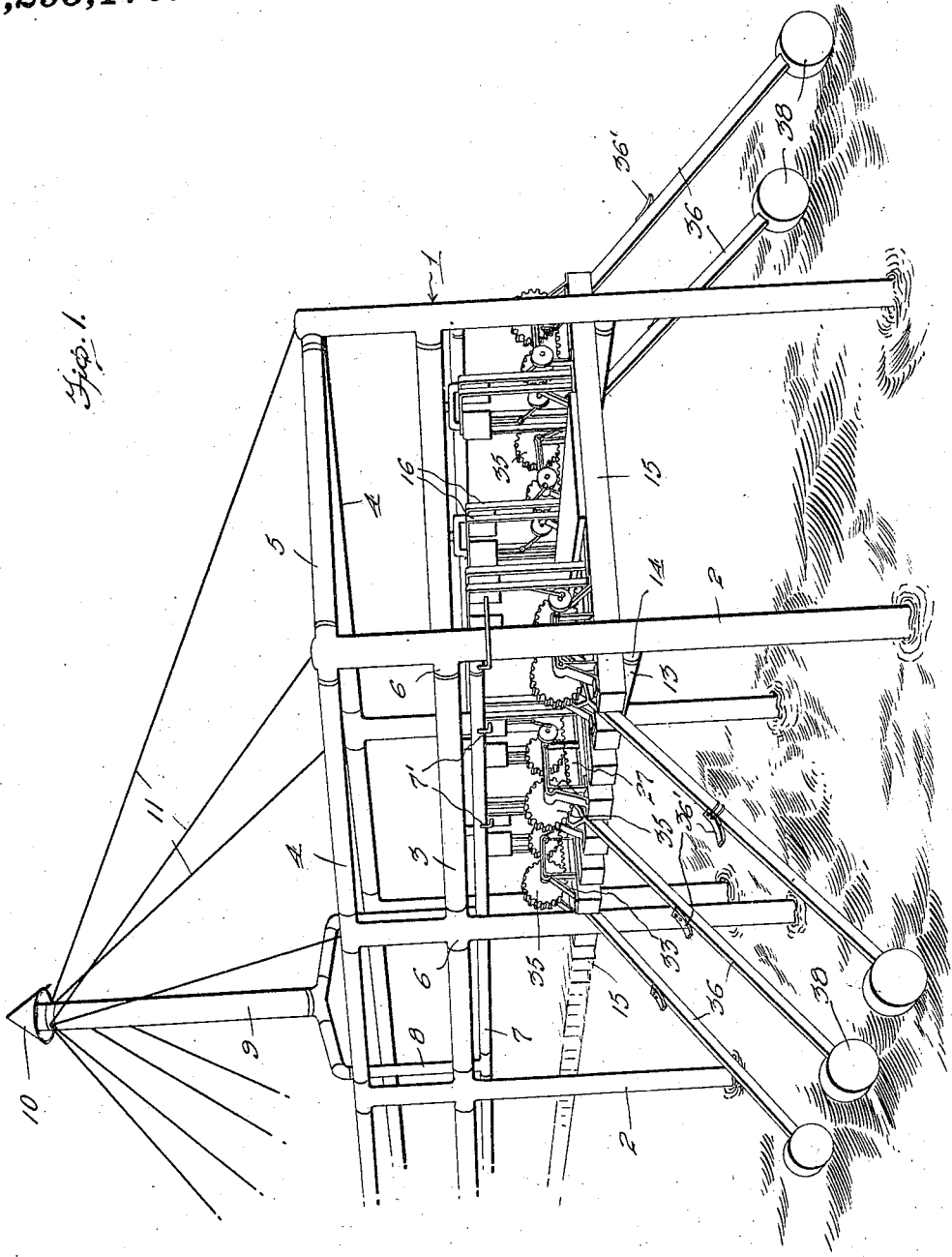

UNITED STATES PATENT OFFICE.

IVERSON D. HUDGINS, OF CHAMBLEE, GEORGIA.

FLUID-MOTOR.

1,295,170.  Specification of Letters Patent.  Patented Feb. 25, 1919.

Application filed December 20, 1916. Serial No. 138,018.

*To all whom it may concern:*

Be it known that I, IVERSON D. HUDGINS, a citizen of the United States, and resident of Chamblee, in the county of Dekalb and State of Georgia, have invented certain new and useful Improvements in Fluid-Motors, of which the following is a specification.

The present invention has reference, generally, to fluid motors; and, the invention, relates, more particularly, to an improved fluid motor or motors capable of use in conjunction with streams or other bodies of water for the storing of the motive power derived from the current, waves and other similar disturbances.

The invention has for its principal object to provide a power generating apparatus which will collect and further, materially intensify by gravity through the medium of a system of leverage, the motive power or energy of a body of water, whereby, air may be compressed and stored for use as a means for propelling various forms of machinery, both electrical and mechanical.

It is another object of the invention, and one of equal importance, to provide a supporting means for the power generating apparatus, so constructed and arranged as to permit the storing of the air in its compressed state therein and permit efficient exhaustion of the same therefrom, when desired.

A still further object of the present invention is to provide means for transmitting the power or energy from an active body of water to the power generating apparatus, and, by reason of the novel arrangement of gearing, converting the said power or energy into a form which will permit proper operation of the apparatus; the said transmitting means being capable of automatically adapting themselves to such variations as may occur in the general level of the water.

Other objects relate to considerations of economy of production, installation and maintenance, durability in use, and convenience in operation of the several mechanisms or parts entering into the construction of elements and the above defined general organization of said elements.

One embodiment of the subject-matter of the present invention is shown by way of illustration in the accompanying drawings, in which:

Figure 1 is a perspective of a portion of the improved power generating apparatus, Fig. 2 is a side elevation of the improved transmission and power converting apparatus, the compressing pumps being incidentally shown in fragmental form; and Fig. 3 is a transverse section taken on the line 3—3 of Fig. 2.

Similar characters of reference are employed in all of the above described views to indicate corresponding parts.

Referring now more specifically to the several figures of the said drawings, the improved apparatus is provided with means for supporting the same above a body of water, comprising a pier, indicated in its entirety by the numeral 1 and including a plurality of oppositely disposed spaced apart hollow standards, generally numbered 2. The upper portions of the standards 2 are provided with suitable connections, whereby horizontally arranged piping 3, 4 and 5 may be engaged therewith, as at 6, thus providing an efficient truss or bracing means therefor, and, further, providing a novel reservoir whereby the air compressed by the generating apparatus may be stored therein, the manner of which will be subsequently described. The lower portions of the standards 2 are closed and are embedded in the bed of the stream, thus serving as the usual piles commonly employed for supporting piers. Other piping 7 is arranged upon the pier 1, parallel to the piping 4, 5 and 6 and has tapped thereinto at suitable points pipes 8, the upper portions of which extend at substantially right-angles to the body portions and connect with a vertical tubing 9, said tubing having arranged upon its upper end a cowl or protecting hood 10. Truss wires 11 are connected to the upper end of the tubing 9 and extend downwardly into engagement with the piping 4, thus affording means whereby the tubing 9 will be rendered rigid and liability of collapsing overcome. By so arranging the tubing 9 and connecting the same with the piping 7, I provide means whereby air may be taken from the atmosphere and delivered to the power generating apparatus for compressing, the piping 7 serving, more specifically, as an intake manifold. Elbows 7' are also tapped onto the piping 7 at suitable points throughout the length thereof and permit the introduction of air into the generating or compressing apparatus. Suitable valves may be interposed in these elbows 7' to control the passage of air therethrough. The piping 3 is provided throughout its length with a plurality of taps or nipples 12, the same extending downwardly into engagement with the generating or compressing apparatus and serving as exhaust ports therefor, whereby the compressed air may be expelled therefrom and delivered into the reservoir piping 3, whereupon it will be stored.

Suitable connections may be made with the piping 3 or 4 at the inner end of the pier in order that the compressed air may be exhausted therefrom and conveyed by suitable conduits to machinery to be driven thereby.

A platform for supporting the generating or compressing apparatus is arranged on studding 13, which studding is secured to the standards 2 by suitable unions, as at 14. Upon the studding 13 are arranged a plurality of bolster bars 15, to which the faces of the generating or compressing apparatus, which will be more fully hereinafter described, may be connected.

With a view toward providing means whereby such disturbances as may be caused in a body of water due to tidal or wave forces, may be employed as means for generating power, I secure, as above stated, to the bolster bars 15 any number of air compressing pumps, which may be and preferably are of a duplex type, the pumps being supported by vertical standards 16, the lower ends of which are secured by fastening means 17ª to the opposite faces of pairs of the bolster bars 15, while the upper portions thereof are offset, as at 18, and embrace the sides and tops of the pump cylinders. A substantially U-shaped base or cylinder supporting bar 19 is secured to the standards 16 at points adjacent the offset portions 18, or bolts 20 and serves for an obvious purpose. The depending piston rods 21 of the air compressing pumps pass through guide arms 22, whereby lateral or other undue movement of the same during operation will be prevented.

Rotatably supported in bearing arms 23, which arms are secured to the opposite marginal edges of the bolster bars 15, as at 24, is a shaft 25 carrying a gear or pinion 26 of suitable diameter. A rack bar 27 is slidably arranged directly beneath the pinion 26 and meshes with the gear 26. Crank disks 28 and 29 are mounted upon the opposite extremities of the shaft 25 and have pitmen 30 connected therewith, the upper ends of which are pivotally connected to the adjacent ends of the piston rods 21, as at 31. Upon reciprocation of the rack bar 27, an oscillatory motion will be imparted to the shaft 25 by reason of gear 26, hence, due to the connection of the crank disks 28 and 29 with the piston rods 21 of the compressing pump cylinders, the pistons working therein will be caused to perform their assigned functions, namely, the intaking, compressing, and the exhausting of air, which air, as hereinbefore stated is delivered in a compressed state into the reservoir afforded by the pier 1.

Referring now to the means for transmitting motion to the rack bar 27, whereby, the duplex air compressing pumps, which I shall indicate, for the purpose of convenience by the numeral 32, may be provided, I rotatably mount in arms 33, a gear wheel 35, the same being constantly in mesh with the rack bar 27. An arm 36 is secured to the gear wheel 35, as at 37 and projects diagonally downward in proximity to the pier and water, the lowermost end of the said arm carrying a float or pontoon 38, whereby the same will be rendered sufficiently buoyant and will respond instantly to variations caused by the disturbances in the said body of water. Thus, it is evident, that upon the occurrence of variations of level in the water, caused by the tidal changes, waves or swells, the arm 36 will be oscillated, thereby rocking the gear wheel 35 and by reason of its engagement with the rack bar 37 imparting a reciprocatory motion thereto, which motion in turn will be delivered to the pistons of the duplex air compressing pump engaged therewith. To prevent injury to the piping of the pier construction, by the striking of the arms 36 thereagainst during abnormal condition of the water, buffer springs 36' are secured thereto and obviously serve as shock absorbing means.

It will be understood, that although but one air compressing pump and power transmitting means has been described, any number thereof may be employed, the same being preferably arranged upon the opposite sides of the bolster bars 15 supported on the pier 1. Thus, by employing a battery of air compressing pumps and power transmitting means, an enormous amount of air will be compressed and stored for various uses. Furthermore, it is to be appreciated, that the pier 1 may be of any desired length, that is, the same may project beyond the shore line for any distance, such as conditions or preference may dictate, thereby, enabling the arranging of any number of air compressing pumps and power transmitting means thereon.

Although it is believed that the description hereinbefore contained will permit a full understanding of the improved power generating apparatus, the operation of the same may be reviewed as follows: Upon oscillation of the arms 36, due to variations or disturbances in the body of water with which the same are engaged, a reciprocatory movement will be derived therefrom through the medium of the rack bar 27, which is in mesh with the gear wheels 26 and 35. Hence, the pistons are actuated whereby the various duplex compressing pumps will be alternately driven, intaking from the intake manifold 7 and exhausting into the piping 3, whereupon, the air now in compressed form will be stored in the pier. As it becomes necessary to exhaust the compressed air from the reservoir or pier, the connection as engaged with the piping 3 or 4 at the inner end of the same may be opened accordingly.

It is to be also noted, that by reason of pivotal mounting of the arms 36, such variations, whether minor or major, occurring in the level of the water will not affect the operation of my improved apparatus, since the pontoons 38 will permit the said arms 36 to automatically adapt themselves thereto.

As many changes could be made in the above construction and many widely different embodiments of this invention could be made without departing from the scope thereof, it is intended that all matter contained in the above description or shown in the accompanying drawings shall be interpreted as illustrative and not in a limiting sense. It is also to be understood that the language used in the following claim is intended to cover all of the generic and specific features of the invention herein described and all statements of the scope of the invention, which, as a matter of language might be said to fall therebetween.

I claim:

A water motor including, in combination with a reservoir support, a substantially U-shaped upright secured to said support having its upper end portions offset, a bracket arm secured to the offset portions of said support, alined sets of bearing brackets on the support in proximity to the upright, pump cylinders arranged on the offset portions of the upright and said bracket arm, a gear supported in certain of said bearing brackets, a second gear supported in the remaining set of the bearing brackets, pistons working in the cylinders having eccentric connection with said first gear, a rack slidable under said first and second gears and meshing therewith, a rocker arm secured to the second gear, a buoyant element engaged with the free end of the rocker arm, and means connected to the outlet ports of the pump cylinders and the reservoir support for permitting the storage of air compressed therein.

In testimony whereof, I affix my signature hereto.

IVERSON D. HUDGINS.

Copies of this patent may be obtained for five cents each, by addressing the "Commissioner of Patents, Washington, D. C."